(12) United States Patent
Strohmeier et al.

(10) Patent No.: US 9,991,977 B2
(45) Date of Patent: Jun. 5, 2018

(54) SMART TESTING MANAGEMENT

(71) Applicant: Rohde & Schwarz GmbH & Co. KG, Munich (DE)

(72) Inventors: Anton Strohmeier, Munich (DE); Michael Block, Munich (DE); Ralf Plaumann, Forstern (DE); Thomas Lutz, Munich (DE); Franz Obermayr, Kirchdorf an der Amper (DE); Christiane Klaus, Munich (DE); Jens Volkmann, Birnbach (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 0 days. days.

(21) Appl. No.: 15/159,936

(22) Filed: May 20, 2016

(65) Prior Publication Data
US 2017/0126336 A1 May 4, 2017

Related U.S. Application Data

(60) Provisional application No. 62/249,111, filed on Oct. 30, 2015.

(51) Int. Cl.
*H04B 17/00* (2015.01)
*H04B 17/345* (2015.01)
*H04B 17/318* (2015.01)

(52) U.S. Cl.
CPC ......... *H04B 17/345* (2015.01); *H04B 17/318* (2015.01)

(58) Field of Classification Search
CPC ...... G06F 11/2294; G06F 11/26; G06F 11/22; G01R 31/31718; G01R 31/3177; G01R 1/07; G01R 35/005; H04B 17/29; H04B 17/0085; H04B 3/46; H04W 24/06
See application file for complete search history.

(56) References Cited

U.S. PATENT DOCUMENTS

| | | | |
|---|---|---|---|
| 7,304,469 B1 * | 12/2007 | Bradley ................ | G01R 27/28 324/615 |
| 2003/0060193 A1 * | 3/2003 | Kurita .................... | H04B 17/00 455/423 |
| 2003/0182503 A1 * | 9/2003 | Leong ................... | G06F 3/0601 711/114 |
| 2008/0144841 A1 * | 6/2008 | Goldstein ............... | G01H 3/14 381/56 |

(Continued)

*Primary Examiner* — Edward Urban
*Assistant Examiner* — Max Mathew
(74) *Attorney, Agent, or Firm* — Potomac Technology Law, LLC

(57) ABSTRACT

The invention is related to a smart testing apparatus and preferably a method for testing at least a first DUT and a second DUT using a mobile communications testing device. The method comprises the steps of determining, whether a first RF test signal from/to the first DUT interferes with a second RF test signal from/to the second DUT. It determines, whether the second RF test signal from/to second DUT interferes with the first RF test signal from/to the first DUT. It predetermines, whether at least measuring the first measuring result obtained by applying the first RF test signal is disturbed above a first disturbance threshold value. It predetermines, whether at least a second measuring result obtained by applying the second RF test signal is disturbed above a second disturbance threshold value.

13 Claims, 6 Drawing Sheets

(56) References Cited

U.S. PATENT DOCUMENTS

| | | | | |
|---|---|---|---|---|
| 2009/0104605 A1* | 4/2009 | Siuzdak | ............... | C12Q 1/6883 |
| | | | | 435/6.18 |
| 2009/0323652 A1* | 12/2009 | Chen | ...................... | H04B 1/406 |
| | | | | 370/338 |
| 2010/0237879 A1* | 9/2010 | Wang | ................. | G01R 31/2894 |
| | | | | 324/627 |
| 2010/0304686 A1* | 12/2010 | Kennedy | ............... | H04W 24/00 |
| | | | | 455/67.11 |
| 2013/0018613 A1* | 1/2013 | Chow | ..................... | G01R 29/26 |
| | | | | 702/69 |
| 2014/0097854 A1* | 4/2014 | Hermeling | ........... | G01R 27/025 |
| | | | | 324/509 |
| 2014/0128006 A1* | 5/2014 | Hu | ....................... | H04B 17/104 |
| | | | | 455/73 |
| 2014/0160955 A1* | 6/2014 | Lum | .................... | H04W 24/06 |
| | | | | 370/252 |
| 2014/0315495 A1* | 10/2014 | Joseph | ................. | H04W 24/08 |
| | | | | 455/67.11 |

* cited by examiner

SMART TESTING MANAGEMENT

RELATED APPLICATIONS

This application claims the benefit of the earlier filing date under 35 U.S.C. § 119(e) of U.S. Provisional Application Ser. No. 62/249,111 (filed 2015 Oct. 30).

FIELD

The invention is related to a smart testing system. More specifically, the invention is related to a method for testing at least a first device under test (DUT), and a second DUT using a mobile communications testing device. The invention is further related to a testing apparatus for testing at least a first DUT and a second DUT. Further, the invention is related to a testing environment in a production process of mobile communication devices, such as user equipment, e.g., handheld devices.

BACKGROUND

Nowadays, production environments utilize testing apparatuses to evaluate and to test a plurality of DUTs. A DUT testing apparatus has to be capable of testing each DUT independently without being influenced by the tests provided to another DUT in the testing apparatus. This is necessary to evaluate the behavior of the DUTs and to avoid interference between different DUTs that are tested in the testing apparatus. Disadvantageously, interference between two independent DUTs distort the testing results and increase measurement errors that lead to a false evaluation of the DUT's behavior under test conditions.

Thus, normally the DUTs in such an apparatus are electrically isolated to avoid such interference. A typical electrical isolation value between the different DUTs is approximately in the range of 60 dB or higher. Such an isolation value might be a customer's requirement to obtain a standardized procedure.

To assure the prohibition of such false evaluations due to disturbing interference between different DUTs, a higher isolation between each DUT is applicable. A higher isolation, such as dedicated shielding for each DUT, increases the costs for the evaluation of each DUT, raises the needed time for testing the DUT and thus raises the production costs. Thus, a higher isolation should be avoided.

To avoid the above-mentioned interference, it is also possible to assure that only one DUT is tested per given timeslot. Thus, the other DUTs have to be switched inactive until the evaluation and testing procedure of the active DUT is finished. Such an approach is very time-consuming in case a plurality of DUTs should be tested in a short period of time.

Another known approach is the use of separate testing plans in accordance with the frequency range that should be tested. Such separate testing plans are hard to maintain during the testing procedure since a plurality of independent test plans are required for each DUT. Additionally, only a limited number of combinations, such as two independent time-division-synchronous-code-division-multiple-access, TD-SCDMA, frequency bands, can be tested simultaneously because there are only two possibilities to arrange these TD-SCDMA frequency bands.

What is needed, therefore, is an approach for increasing the number of DUTs that can be tested simultaneously in a production environment, and to decrease the evaluation and test processing time, while minimizing or eliminating interference between the DUTs being tested simultaneously.

SOME EXAMPLE EMBODIMENTS

Embodiments of the present invention advantageously address the foregoing requirements and needs, as well as others, by providing methods and test apparatuses that facilitate simultaneous testing of an increased number of DUTs in a production environment, and a decrease in the evaluation and test processing time, while minimizing or eliminating interference between the DUTs being tested simultaneously.

In accordance with example embodiments, a method for testing at least a first device under test (DUT) and a second device under test (DUT) is provided. The method comprises determining whether a first radio frequency (RF) test signal from/to the first DUT interferes with a second radio frequency (RF) test signal from/to the second DUT. The method further comprises determining whether the second RF test signal from/to the second DUT interferes with the first RF test signal from/to the first DUT. The method further comprises predetermining whether at least a first measuring result obtained by applying the first RF test signal is disturbed above a first disturbance threshold value, and predetermining whether at least a second measuring result obtained by applying the second RF test signal is disturbed above a second disturbance threshold value. The disturbance threshold values may be predefined in testing procedures for testing the DUT. The method according to such embodiments thereby assures that a measuring result of a DUT is only valid in case an applied RF test signal does not disturb the measuring result of the DUT.

By way of example, a DUT may consist of any communication device that is capable of sending and receiving electrical signal over an air interface. By way of example, a DUT is a mobile communication device, such as a handheld user equipment (UE) of device (e.g., a smart phone or a portable computing device, such as laptop, tablet, etc.), or a radio communication device. Alternatively, the DUT is a stationary communication device, such as equipment that is related to a communications system. By way of further example, the DUTs are each of a configuration that makes it difficult to provide testing plans that assure a testing of each DUT individually without disturbing an adjacent DUT. By way of further example, the DUT may be a radio communication device used in a radio communication environment according to any of the radio frequency ranges from 3 Kilohertz to 300 Gigahertz.

The DUT may be employed in a wireless communication environment, such as a long time evolution (LTE) system, Universal Mobile Telecommunications System (UMTS), a Global System for Mobile Communications (GSM), or any such wireless communications system. Additionally and/or alternatively, the wireless communications system is a wireless local area network (WLAN), for example, according to any of the standards according to IEEE 802.11.

According to example embodiments, the transmission and reception behavior of such DUTs is evaluated. This is achieved by applying an RF test signal to the DUT and analyzing the frequency spectrum the DUT obtains and sends out using an analyzing device, such as a vector network spectrum analyzer (VNA). By way of example, an RF test signal is a signal that is applied to a specific DUT to identify its behavior, such as electromagnetic compatibility (EMC) that may cause electromagnetic interference (EMI). Further, to speed up the evaluation process by simultaneously testing a plurality of DUTs, according to example embodiments, the testing is performed in a manner whereby one DUT does not interfere or distort the measurement results of another DUT being simultaneously tested.

According to a further embodiment, one or more of the first measuring result and the second measuring result is an error vector magnitude (EVM) value or a bit error rate (BER) value or a received signal strength indication (RSSI) value. The EVM, BER and RSSI values as first measuring result and/or second measuring result are used to classify the DUT according to standards requirements and to assure a normal behavior of the DUT under real conditions.

According to a further embodiment, one or more of the first measuring result and the second measuring result is a power value. By way of example, the power value is either an adjacent channel power (ACP) value or an adjacent channel leakage power ratio (ACLR) value. The ACPR is a ratio between the total power of an adjacent channel, such as an intermodulation signal to its main channel's power, the useful signal. There are at least two ways of measuring the ACPR. The first way is by finding 10*log of the ratio of the total output power to the power in adjacent channel. The second method is to find the ratio of the output power in a smaller bandwidth around the center of carrier to the power in the adjacent channel. The smaller bandwidth is equal to the bandwidth of the adjacent channel signal. Second way is more popular, because it can be measured easily. ACPR is desired to be as low as possible. A high ACPR indicates that significant spectral spreading has occurred. These power values classify the DUT to assure that subsequent channels in a communication system are not disturbed when using such a DUT. Since the communications systems in nowadays standards comprise multi-frequency- and multi-coding-algorithms, it is preferred to assure that a DUT that functions according to such a standard does not interfere with channels that the DUT is not allocated to.

According to a further embodiment, the method further comprises testing the first DUT and the second DUT simultaneously when both the first threshold value and the second value are undershot. In case the undershot is recognized, it is assured that the isolation between the first DUT and the second DUT is high enough and the measuring results do not interfere. According to an alternate embodiment, the method further comprises testing the first DUT and the second DUT sequentially when at least one of the first threshold value and the second threshold value is exceeded. It is sufficient if one of the threshold values is exceeded. This avoids interference between the DUTs in the testing apparatus and to assure that the measuring results are not faulty or tampered.

According to a further embodiment, the method further comprises determining of an isolation value between the first DUT and the second DUT, and storing the isolation value as an isolation matrix. By way of example, the isolation value is a power isolation value that is achieved by measuring the received power value at a first DUT and measuring the transmitted power value of the second DUT. Since these isolation values are dependent on the testing apparatus and the slot at which the specific DUT is arranged at, it is helpful to apply an isolation matrix in order to recognize these specific isolation values.

According to further embodiments, the number of DUTs is greater than two so that a plurality of DUTs (e.g., tens of DUTs) can be evaluated and tested simultaneously.

In accordance with additional example embodiments, a testing apparatus is provided for testing at least a first DUT and a second DUT. The apparatus comprises a first terminal for connecting a first DUT, a second terminal for connecting a second DUT, a signal generating unit, and a central processing unit. The central processing unit is configured to (1) determine whether a first radio frequency (RF) test signal from/to the first DUT interferes with a second radio frequency (RF) test signal from/to the second DUT, (2) determine whether the second RF test signal from/to the second DUT interferes with the first RF test signal from/to the first DUT, (3) predetermine whether at least a first measuring result obtained by applying the first RF test signal is disturbed above a first disturbance threshold value, and (4) predetermining whether at least a second measuring result obtained by applying the second RF test signal is disturbed above a second disturbance threshold value. For example, the test apparatus consists of a testing rack at which a plurality of DUTs can be connected.

By way of example, the central processing unit keeps track of all resource allocation requests of each DUT. It maintains an isolation value matrix with isolation between the different terminals. For each spectrum or resource allocation, the conflict of measuring results is advantageously checked. This is achieved by applying a central processing unit in the measurement apparatus to identify a threshold value that is above or below a certain disturbance threshold value.

According to one such example embodiment, the signal generating unit is arranged external from the testing apparatus and is connected to the apparatus via a third terminal.

According to further embodiments, the signal generation unit generates signals of higher complexity, such as modulated and coded RF test signals, which may be employed in the above mentioned communications systems. By way of example, the signal generating unit is configured to generate CDMA, FDMA and/or TDMA signals that might be coded using different analog or digital modulation schemes, such as QAM, QPSK or OFDM.

According to further embodiments, a measuring device is connected to a fourth terminal of the apparatus. Thus, the apparatus is only an instance having the central processing unit for allocating the resources to the different DUTs that are connected to the specific terminal. By way of example, the signal generation and the analyzing of the measured signals is done externally by a multi-functional device or by a specific vector network analyzer (VNA).

According to further embodiments, the central processing unit is configured to allocate a resource range for each DUT. By way of example, the resource range for each DUT consists of a frequency spectrum range. By allocating each DUT to a specific frequency range via the central processing unit, the transmitting frequencies and the receiving frequencies can be considered in parallel. In case no interference is obtained, since the transmitting frequencies and the receiving frequencies comprises a frequency gap, the DUT can be tested in parallel. In case the DUTs interfere, which might be predetermined using the central processing unit of the apparatus, the second DUT needs to wait until the first DUTs test sequence is finished and the frequency range is available.

Since all DUTs typically use the same and identical test plan, all DUTs reach the same frequency nearly at the same time. Measurements with limited dynamic range requirements are blocked even if they could be executed for multiple DUTs at the same time. Thus, the central processing unit can be configured to keep track of all RF transmissions which refer to transmitting and receiving transmissions. An isolation value between the terminals is known, especially using the isolation matrix, and the transmitted power of block can discover all power between the different DUT terminals.

According to further embodiments, the frequency resource allocation collision is checked in two ways, meaning that the relationship between the first DUT and the second DUT is tested and the relationship between the second DUT and the first DUT is tested as well to identify interference problems and an undershooting of the disturbance threshold values.

According to further embodiments, the central processing unit is configured to allocate the signal generator unit first and is further configured to subsequently allocate the measurement device. This avoids deadlocks and allows a fixed order of resource allocations. If spectrum or resources are to be allocated in parallel to the signal generating unit and the analyzing unit an order for allocating the resources to the generator first and the analyzer subsequently may be unattainable. Accordingly, a further approach is to allow a generator to allocate the recourses before the analyzer and to allow a spectrum after the instrument. Thus, generator and analyzer can work in parallel and only the analyzer is conflicted, which might be discovered at a later stage.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

Example embodiments of the present invention are illustrated by way of example only and not by way of any limitation in the figures of the accompanying drawings, in which like reference numerals refer to similar elements and/or functions, and in which.

DETAILED DESCRIPTION

REFERENCE SIGNS

Figure 1:
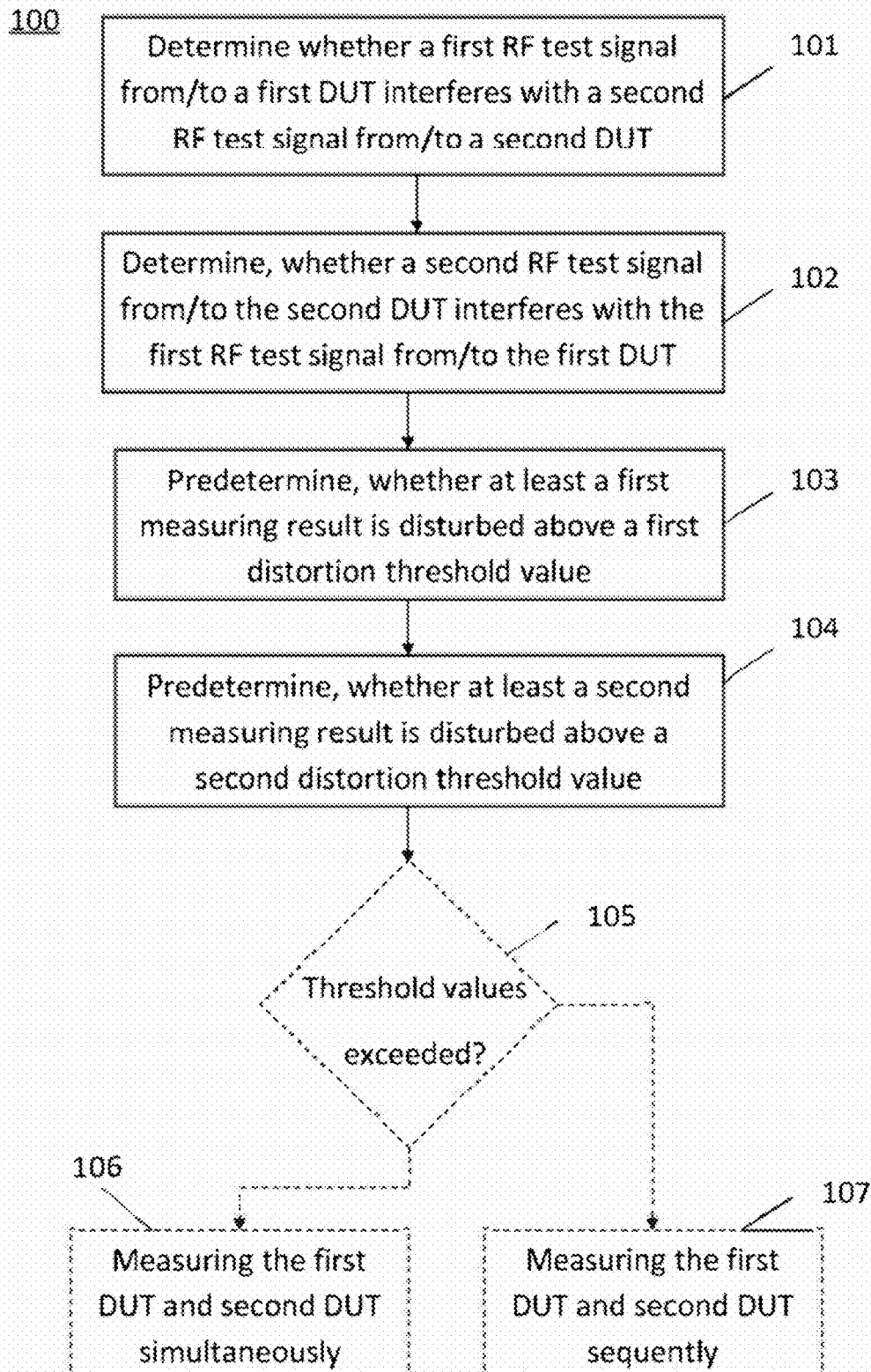
FIG. 1 shows a flow chart of a DUT testing method according to example embodiments of the invention.

1 Testing apparatus, rack
2 First DUT
3 Second DUT
4 Central processing unit
5 Signal Generator
6 Measurement Device
7a-7e Rack Terminals
8 Multi-Function device
101-107 Method steps
205-209 Method steps
f Frequency $\Delta f$ Threshold value, frequency gap
p Electrical Power
$\Delta p1$ First threshold value, first power gap
$\Delta p2$ Second threshold value, second power gap
ACLR Adjacent Channel Leakage Power Ratio
ACP Adjacent Channel Power
RSSI Received Signal Strength Indication
RF Radio Frequency
EVM Error Vector Magnitude
BER Bit Error Rate FIG. 1 shows a flow chart of a DUT testing method according to example embodiments of the invention. According to step 101, it is determined whether a first RF test signal from/to the first DUT 2 interferes with a second RF signal from/to the second DUT 3. According to step 102, it is determined whether the second RF test signal from/to the second DUT 3 interferences with the first RF test signal from/to the first DUT 2. In step 103, it is determined whether at least a first measuring result obtained by applying the first RF test signal is disturbed above a first disturbance threshold value $\Delta p1$. In step 104 it is determined, whether at least a second measuring result obtained by applying the second RF test signal is disturbed above a second disturbance threshold value $\Delta p2$.

Optionally, the method comprises a comparison step 105 in which it is determined whether the first threshold value $\Delta p1$ and/or the second threshold value $\Delta p2$ exceed a specific disturbance value. When the comparison step 105 results in a determination that the threshold values $\Delta p1$, $\Delta p2$ are both not exceeded, according to step 106, the first DUT 2 and the second DUT 3 are tested simultaneously. Alternatively, when the comparison step 105 results in a determination that at least one of the threshold values $\Delta p1$, $\Delta p2$ exceeds the disturbance threshold, according to step 107, the testing of the first DUT 2 and the second DUT 3 is applied sequentially. As illustrated by the dotted outlines, the steps 105, 106 and 107 of the method 100 are optional.

According to such a method, therefore, it is possible to determine two adjacent DUTs behavior in case each DUT 2, 3 obtains a specific RF test signal and is monitored in view of its interference characteristics to the appropriate adjacent DUT 2, 3.

Figure 2:
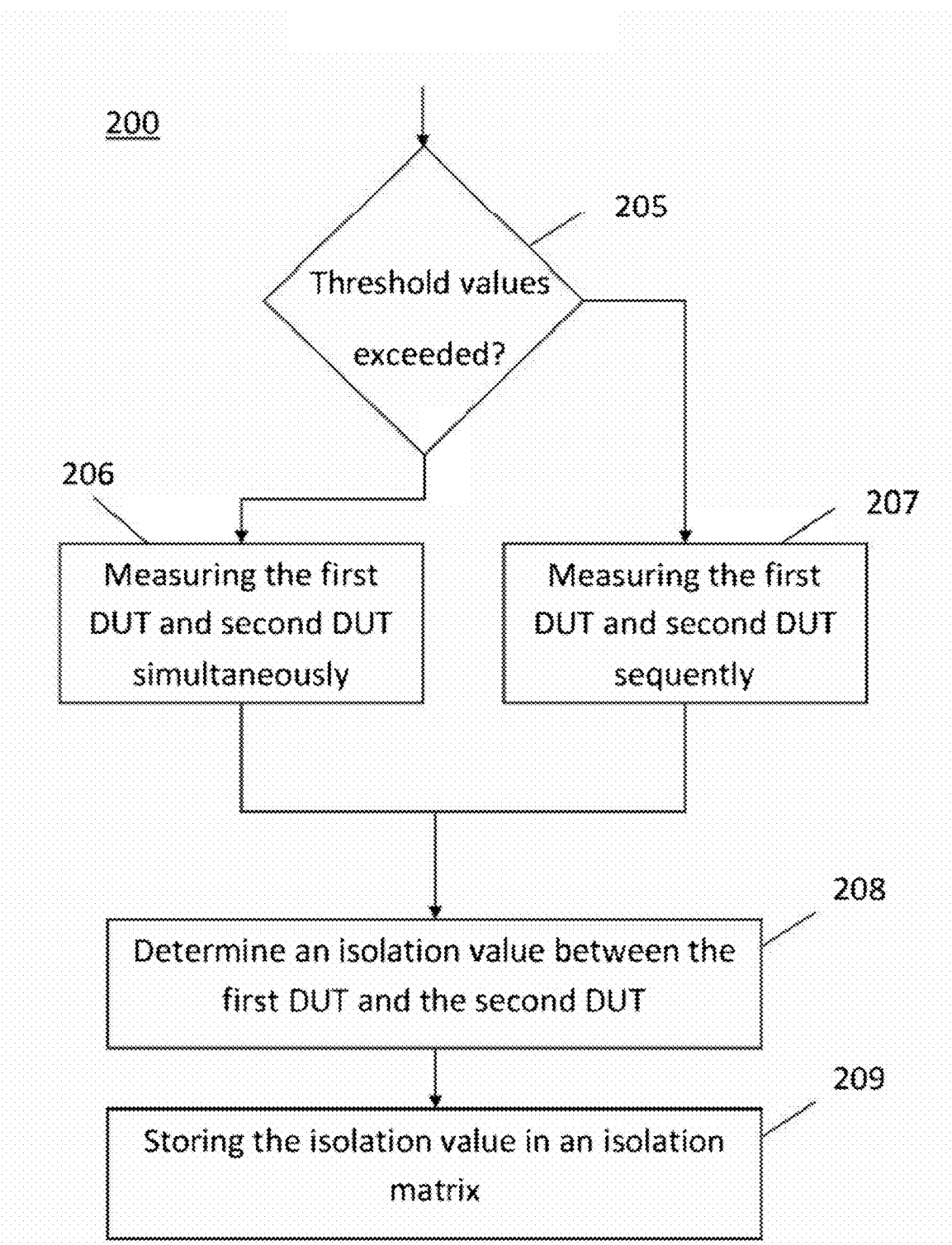
FIG. 2 shows a flow chart of a further DUT testing method according to example embodiments of the invention.

FIG. 2 shows a flow chart of a further DUT testing method according to example embodiments of the invention. The method 200 comprises the steps 101 through 104 as described in accordance with FIG. 1, which are not illustrated in FIG. 2 to avoid unnecessary repetition in the drawings. The subsequent steps 205, 206 and 207 are respectively identical to the steps 105, 106 and 107 according to FIG. 1, and thus are not described again with respect to FIG. 2. In step 208, an isolation value between the first DUT 2 and the second DUT 3 is determined. This isolation value is stored according to step 209 in an isolation matrix in the testing apparatus 1. According to the steps 208 and 209, it is possible to detect the isolation values which are used for later analysis in order to identify when the determined disturbance threshold values $\Delta p1$ and $\Delta p2$ are exceeded or undershot.

Figure 3:
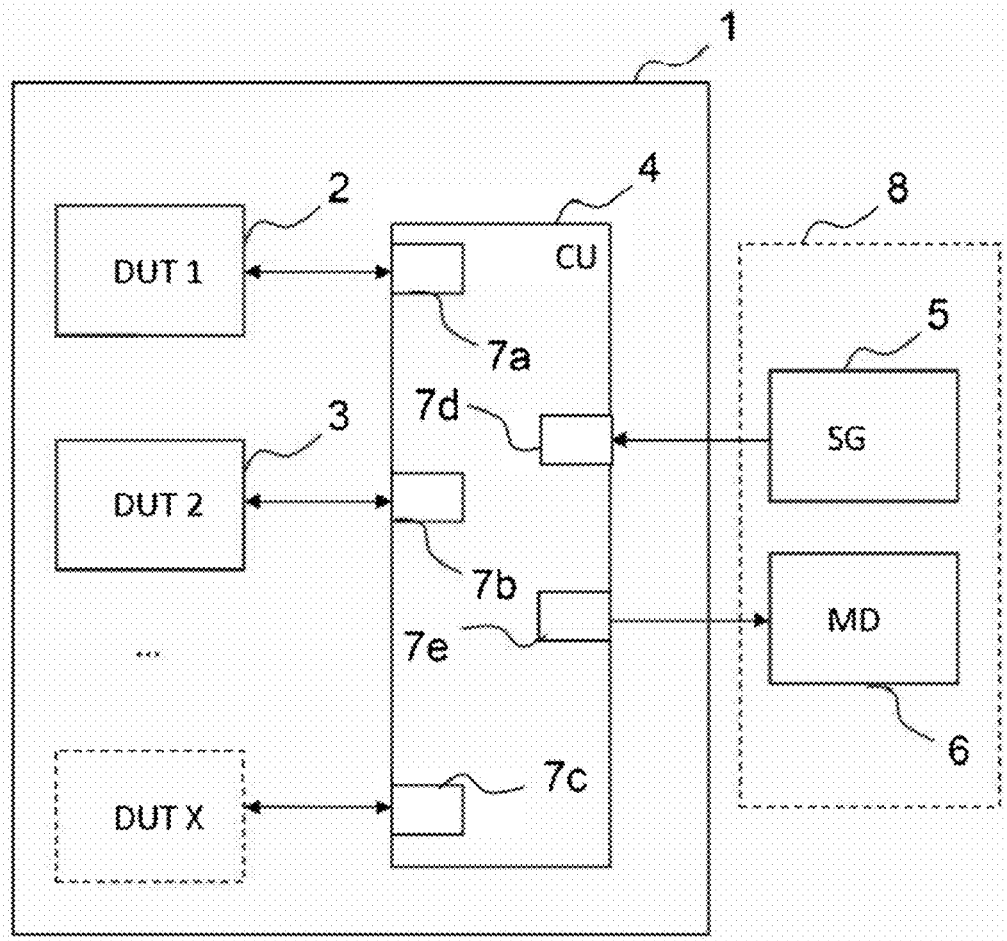
FIG. 3 shows a block diagram of a DUT test apparatus according to example embodiments of the invention.

FIG. 3 shows a block diagram of a DUT test apparatus according to example embodiments of the invention. The testing apparatus 1, for example, may consist of a testing rack in which a plurality of DUTs (DUT 1, DUT 2, . . . , DUT X) could be arranged and functionally connected. The testing apparatus 1 comprises a central processing unit 4 that comprises a plurality of terminals. A first terminal 7a is configured to connect the first DUT 2. A second terminal 7b is configured to connect the second DUT 3. A third terminal 7d is configured to obtain signals generated by a signal generation unit 5. A fourth terminal 7e is configured to provide measuring results to a measurement device 6 that is connected to the fourth terminal 7e.

According to FIG. 3, the signal generation unit 5 and the measuring device unit 6 are arranged externally from the testing apparatus 1. The signal generation unit 5 and the measuring device 6 might be incorporated into a multi-functional device 8. The central processing unit 4 is configured to process the above described method according to FIG. 1 and FIG. 2.

Thus, the testing apparatus 1 is configured to allocate resources to the specific DUT 2, 3 to obtain measuring results for evaluating and controlling the DUTs 2, 3. To avoid deadlocks, a fixed order for resource allocation is followed. Therein the signal generating unit 5 is allocated first using the central processing unit 4 and subsequently, the measuring device 6 is allocated to obtain the measuring results. This avoids an interference of the signal generation unit 5 and the measuring device 6 irrespective whether the DUTs 2, 3 interfere with each other.

Figure 4:
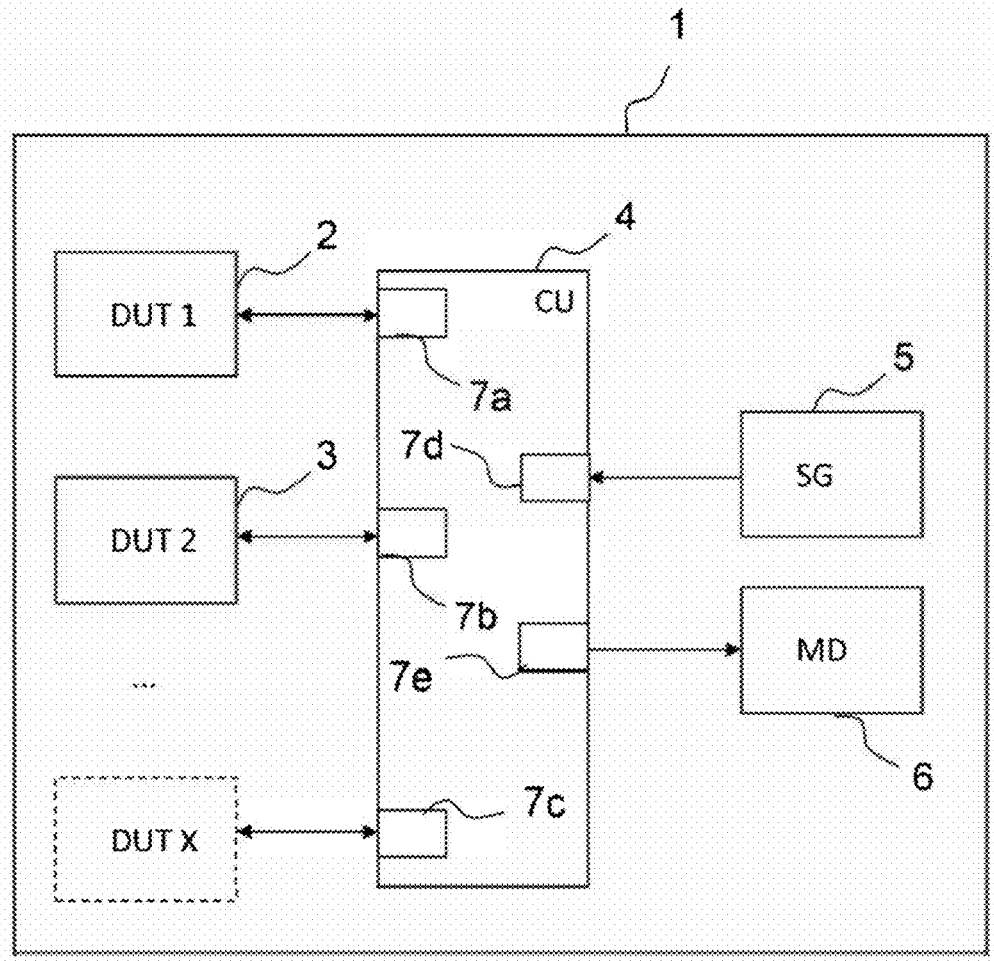
FIG. 4 shows a block diagram of a further DUT test apparatus according to example embodiments of the invention.

FIG. 4 shows a block diagram of a further DUT test apparatus according to example embodiments of the invention. Only the differences between FIG. 3 and FIG. 4 are described in the following. According to FIG. 4, the signal generation unit 5 and the measuring device unit 6 are units of the testing apparatus 1 itself. Thus, the evaluation and testing procedure is applied and only the DUTs 2, 3, X are connected to the respective input terminals 7a, 7b or 7c. The signal generation and the analysis using a measuring device 6 are obtained within this testing apparatus 1. Thus, an operator using this testing apparatus 1 does not necessarily need to adapt the RF test signals to be applied or the measuring device 6 in order to obtain the measuring results.

The test plans of identical DUTs 2, 3, X are typically the same. Thus, all DUTs 2, 3, X reach the same frequency ranges nearly at the same time. Only minimal latency times between the DUTs 2, 3, X avoid that the same frequencies are reached at the same time exactly. Testing of highly limited dynamic frequency ranges thus require a huge blocking even if they could be executed for multiply DUTs 2, 3, X at the same time. Thus, the central processing unit 4 keeps track of all RF transmissions which are mainly the receiving transmission RX and the transmitting transmission Tx. Since the isolation between the first terminal 7a and the second terminal 7b is known to the central processing unit 4, it is possible to check whether the DUT 1 interferes with the DUT 2.

Figure 5:
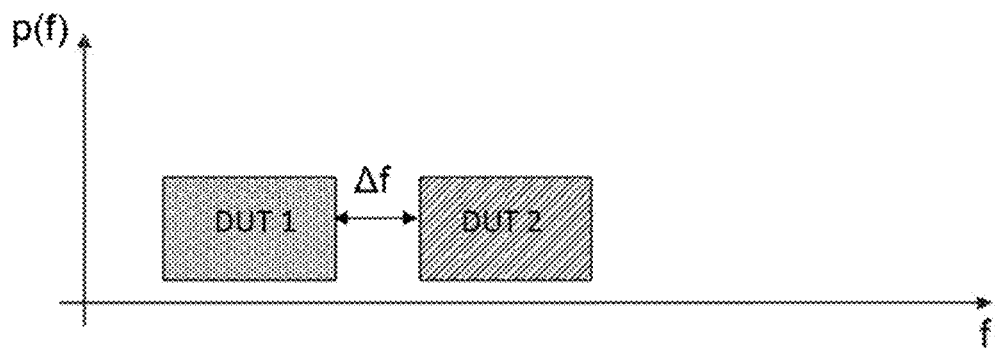
FIGS. 5A and 5B show interference with respect to applied RF test signals.
Figure 5:
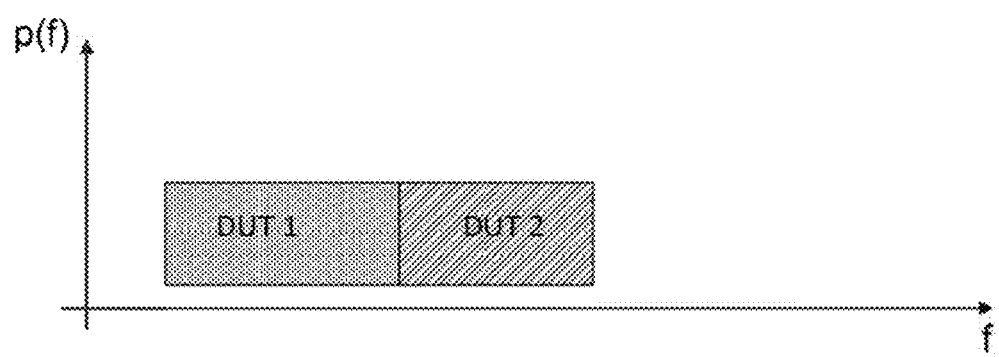

FIGS. 5A and 5B show interference of different frequency ranges with respect to applied RF test signals. According to FIG. 5A, the first DUT 1 is checked and evaluated with a frequency gap $\Delta f$ to the frequency range of the second DUT 2. In such a case, no interference is obtained and the DUTs 2, 3 can be tested simultaneously. According to in FIG. 5B the first DUT 2 interferes with its frequency range into the frequency range of the second DUT 3. In such a case, the DUTs are tested and evaluated sequentially.

Figure 6:
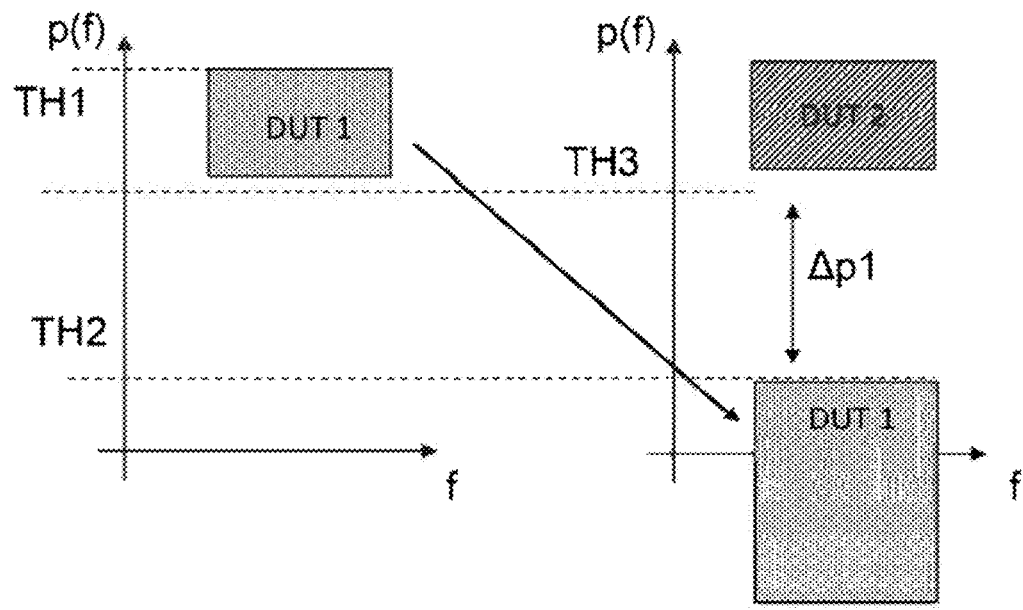
FIGS. 6A and 6B show disturbance threshold values for DUT testing methods according to example embodiments of the invention.
Figure 6:
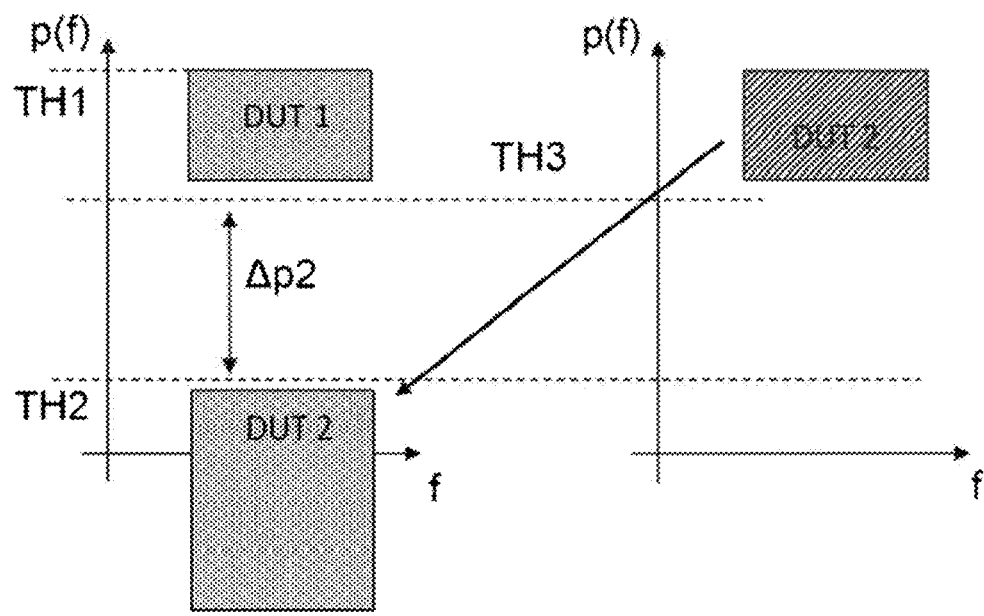

FIGS. 6A and 6B show disturbance threshold values for DUT testing methods according to example embodiments of the invention.

According to FIG. 6A it is first checked whether a first RF test signal from the first DUT 2—that is arranged in the first terminal 7a—exceeds a threshold value Th1. This threshold value is a transmit threshold value that should not be exceeded to avoid inter channel interferences. At the same time it is determined whether the first RF test signal from the first DUT 2 interferes with a second RF test signal from the second DUT 3. Therefore, it is predetermined whether the first disturbance threshold $\Delta p1$, which is the difference between a second threshold TH2 and a third threshold TH3, is exceeded or undershot. In case it is predetermined that the value $\Delta p1$ is exceeded, the DUTs 1, 2 should not be tested and evaluated simultaneously.

According to FIG. 6B, in case it is predetermined that the value $\Delta p1$ is undershot, a second predetermining step 104 is performed. Therein it is checked whether the second RF test signal from the second DUT 3 interferes with the first RF test signal of the first DUT 2. Therefore, it is predetermined whether a second disturbance threshold $\Delta p2$, which is the difference between the second threshold TH2 and the third threshold TH3 is exceeded or undershot. In case it is predetermined that the value $\Delta p2$ is exceeded, the DUTs 1, 2 should not be tested and evaluated simultaneously. In case it is predetermined that the value $\Delta p2$ is exceeded, a simultaneous testing of DUT 2 and DUT 3 is possible.

This is a resource allocation collision check in two ways between the first DUT 2 and the second DUT 3 in order to identify whether a parallel evaluation and testing of the DUTs 2, 3 is possible. Since the disturbance threshold values $\Delta p1$ and $\Delta p2$ are known and, for instance, exceed a value above 60 dB, the transmitted power block all lower power levels. The central processing unit 4 keeps track of all resource allocation requests. It maintains an isolation matrix with isolation values between the different terminals 7a to 7c. For a new spectrum allocation, the situation is checked again.

For frequency sweeps the complete frequency range is locked. The signal bandwidth is manually added to the testing apparatus 1. A noise margin might be added for the testing, for instance 20 dB for a power management.

In order to avoid deadlocks, a fixed order of resource allocation is followed. The first allocation is provided to the signal generating unit 5 and subsequently the measuring device 6 is allocated. If the spectrum must be allocated in parallel to the analyzer and the generator 5, a strict order is no longer possible. In a first approach, the generator 5 is allocated before the measuring device 6 and a spectrum is allocated after the instrument.

While various embodiments of the present invention have been described above, it should be understood that they have been presented by way of example only, and not limitation. Numerous changes to the disclosed embodiments can be made in accordance with the disclosure herein without departing from the spirit or scope of the invention. For example, features of the example embodiments described, shown and/or claimed herein can be combined with each other. Thus, the breadth and scope of the present invention is not intended to be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

What is claimed is:

1. A method for testing at least a first device under test (DUT) and a second device under test (DUT), using a signal generator and a measuring device, the method comprising:
   determining whether a first radio frequency (RF) test signal from/to the first DUT interferes with a second radio frequency (RF) test signal from/to the second DUT;
   determining whether the second RF test signal from/to the second DUT interferes with the first RF test signal from/to the first DUT;
   determining whether at least a first measuring result, of the measuring device, obtained by applying the first RF test signal is disturbed above a first disturbance threshold value, wherein the first disturbance threshold value is a difference between a first threshold and a second threshold while performing the determination whether the first RF test signal from/to the first DUT interferes with the second RF signal from/to the second DUT;
   determining whether at least a second measuring result, of the measuring device, obtained by applying the second RF test signal is disturbed above a second disturbance threshold value, wherein the second disturbance threshold value is the difference between the first threshold and the second threshold while performing the determination whether the second RF test signal from/to the second DUT interferes with the first RF test signal from/to the first DUT; and
   allocating resources of the signal generator and the measuring device to the first and second DUTs in a fixed order of resource allocation to avoid deadlocks, whereby a resource allocation is first provided for the signal generator and subsequently provided for the measuring device; and
   wherein a first frequency range for the first RF test signal is set apart from a second frequency range for the second RF test signal by a frequency gap $\Delta f$, and
   wherein, if neither of the first and second disturbance threshold values exceeds a specific disturbance value, then the method further comprises testing the first and second DUTs simultaneously, and alternatively, if at least one of the first and second disturbance threshold values exceeds the specific disturbance threshold, then the method further comprises testing the first and second DUTs sequentially.

2. The method according to claim 1, wherein one or more of the first measuring result and the second measuring result is an error vector magnitude (EVM) value or a bit error rate (BER) value or a received signal strength indication (RSSI) value.

3. The method according to claim 1, wherein one or more of the first measuring result and the second measuring result is a power value.

4. The method according to claim 3, wherein the power value is either an adjacent channel power (ACP) value or an adjacent channel leakage power ratio (ACLR) value.

5. The method according to claim 1, further comprising:
   testing the first DUT and the second DUT simultaneously when both the first threshold value and the second value are not exceeded.

6. The method according to claim 1, further comprising:
   testing the first DUT and the second DUT sequentially when at least one of the first threshold value and the second threshold value is exceeded.

7. The method according to claim 1, further comprising:
   determining an isolation value between the first DUT and the second DUT, and storing the isolation value as an isolation matrix.

8. An apparatus for testing at least a first device under test (DUT) and a second device under test (DUT), using a signal generator and a measuring device, the apparatus comprising:
   a first terminal for connecting the first DUT;
   a second terminal for connecting the second DUT;
   a third terminal for connecting to the signal generator;
   a fourth terminal for connecting to the measuring device; and
   a processor configured to (1) determine whether a first radio frequency (RF) test signal from/to the first DUT interferes with a second radio frequency (RF) test signal from/to the second DUT, (2) determine whether the second RF test signal from/to the second DUT interferes with the first RF test signal from/to the first DUT, (3) determine whether at least a first measuring result, of the measuring device, obtained by applying the first RF test signal is disturbed above a first disturbance threshold value, wherein the first disturbance threshold value is a difference between a first threshold and a second threshold while performing the determination whether the first RF test signal from/to the first DUT interferes with the second RF signal from/to the second DUT, (4) determine whether at least a second measuring result, of the measuring device, obtained by applying the second RF test signal is disturbed above a second disturbance threshold value, wherein the second disturbance threshold value is the difference between the first threshold and the second threshold while performing the determination whether the second RF test signal from/to the second DUT interferes with the first RF test signal from/to the first DUT, and (5) allocate resources of the signal generator and the measuring device to the first and second DUTs in a fixed order of resource allocation to avoid deadlocks, whereby a resource allocation is first provided for the signal generator and subsequently provided for the measuring device; and
   wherein a first frequency range for the first RF test signal is set apart from a second frequency range for the second RF test signal by a frequency gap $\Delta f$, and
   wherein, if neither of the first and second disturbance threshold values exceeds a specific disturbance value, then the processor is further configured to perform the testing of the first and second DUTs simultaneously, and alternatively, if at least one of the first and second disturbance threshold values exceeds the specific disturbance threshold, then the processor is further configured to perform the testing of the first and second DUTs sequentially.

9. The apparatus according to claim 8, wherein the signal generator is arranged external from the apparatus, and wherein the signal generator is connected to the apparatus via a third terminal of the apparatus.

10. The apparatus according to claim 8, wherein the measuring device is arranged external from the apparatus.

11. The apparatus according to claim 8, wherein the processor is configured to allocate a resource range for each DUT.

12. The apparatus according to claim 11, wherein the resource range for each DUT consists of a frequency spectrum range.

13. The apparatus according to claim 8, wherein the apparatus is a test rack for testing a plurality of DUTs.

* * * * *